United States Patent

Fuld et al.

[19]

[11] Patent Number: 6,098,153
[45] Date of Patent: Aug. 1, 2000

[54] METHOD AND A SYSTEM FOR DETERMINING AN APPROPRIATE AMOUNT OF DATA TO CACHE

[75] Inventors: Stephen Tracy Fuld, Boulder; Stephen Sid Selkirk, LaFayette, both of Colo.

[73] Assignee: International Business Machines Corporation, Armonk, N.Y.

[21] Appl. No.: 09/016,676

[22] Filed: Jan. 30, 1998

[51] Int. Cl.[7] .................................................. G06F 12/00
[52] U.S. Cl. ...................... 711/134; 711/133; 711/137; 711/113
[58] Field of Search ............................. 711/133, 134, 711/136, 137, 113; 712/239, 237, 238, 240

[56] References Cited

U.S. PATENT DOCUMENTS

| | | | |
|---|---|---|---|
| 4,937,736 | 6/1990 | Chang ..................................... | 711/134 |
| 5,226,141 | 7/1993 | Esbensen ................................ | 711/171 |
| 5,283,884 | 2/1994 | Menon et al. .......................... | 711/113 |
| 5,353,430 | 10/1994 | Lautzenheiser ........................ | 711/117 |
| 5,418,921 | 5/1995 | Cortney et al. ........................ | 711/114 |
| 5,568,628 | 10/1996 | Satoh et al. ........................... | 711/113 |
| 5,619,675 | 4/1997 | De Martine et al. .................. | 711/133 |
| 5,649,153 | 7/1997 | McNutt .................................. | 711/137 |
| 5,941,981 | 8/1999 | Tran ....................................... | 711/137 |

OTHER PUBLICATIONS

"Record Caching with Count Key Data Emulation on Fixed Block Architecture Devices," *IBM Technical Disclosure Bulletin*, vol. 38, No. 06,(Jun. 1995).

"Direct Access Storage Device Cache Segment Management," *IBM Technical Disclosure Bulletin*, vol. 37, No. 08, 473–477 (Aug. 1994).

*Primary Examiner*—Glenn Gossage
*Assistant Examiner*—Javad Chavoshi
*Attorney, Agent, or Firm*—Sawyer Law Group; Esther E. Klein

[57] ABSTRACT

A method and a system for determining how much data to cache, that is, optimizing disk caching control by selecting the optimal staging mode are disclosed. Specifically, the method and system of the present invention provides an analytical framework for determining how much data to cache thus producing a maximum hit rate and optimal utilization of computer system resources. The method and system in accordance with the present invention includes determining a history of referencing data on a disk and predicting an optimal staging mode from a plurality of staging modes based upon the history. The method and system of the present invention in the preferred embodiment allow staging in one of at least three modes: record staging, staging to the end of track, and full track staging. In using the history of data referencing to predict the optimal staging mode, the method and system of present invention provide a thorough analytical framework for determining which of the modes of staging data is most desirable in view of prior referencing patterns.

15 Claims, 8 Drawing Sheets

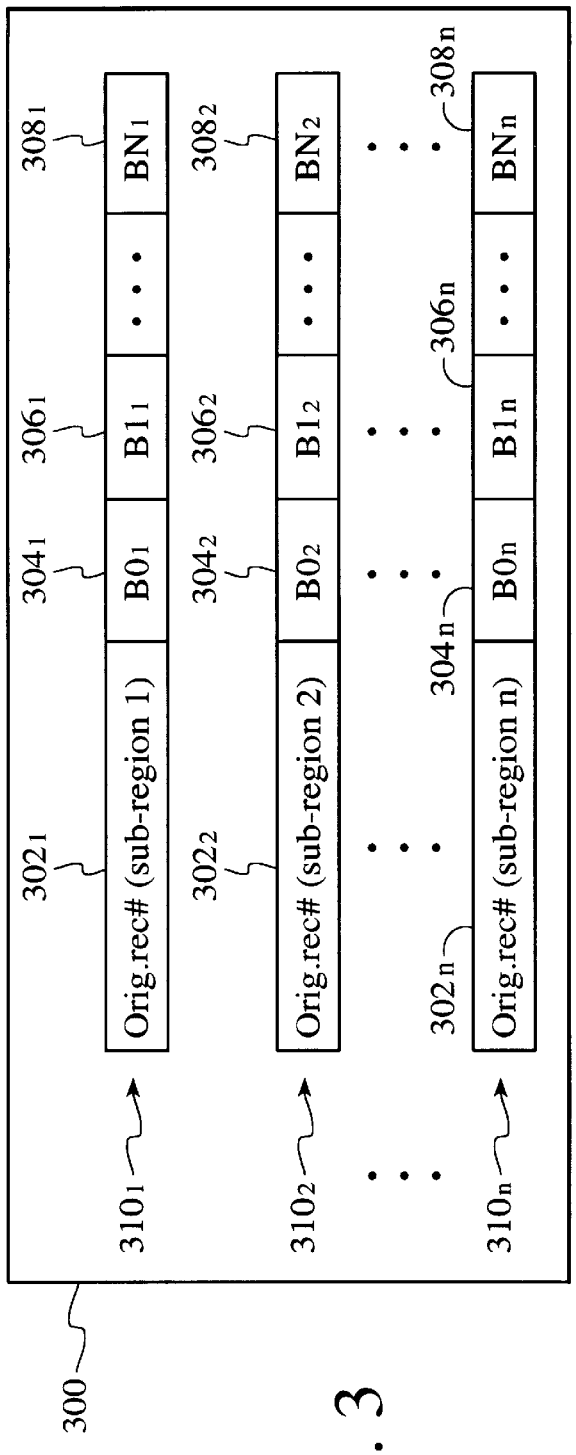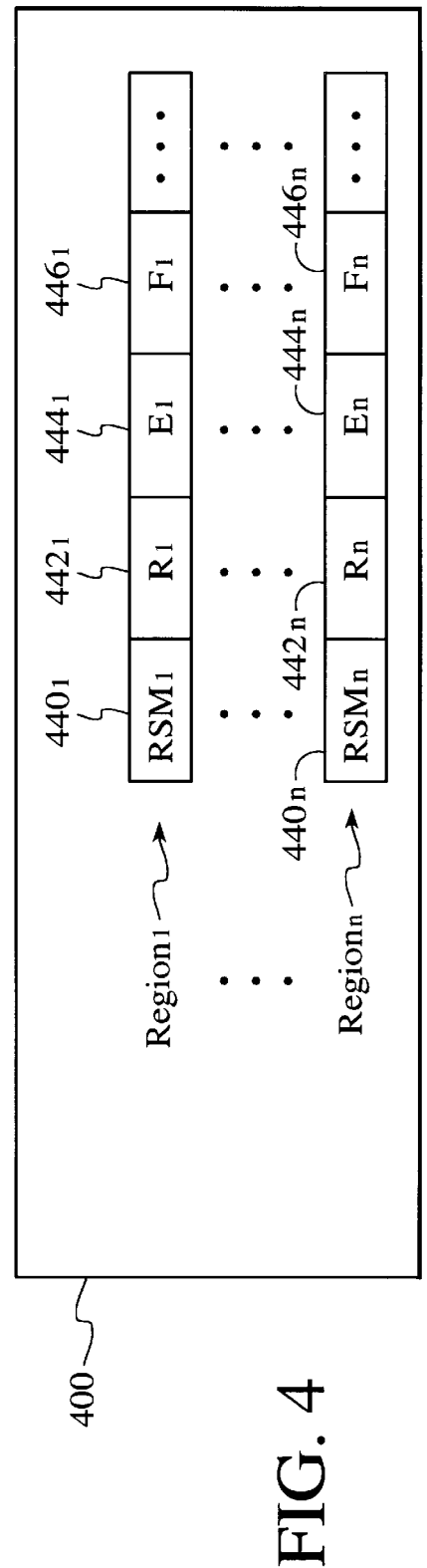

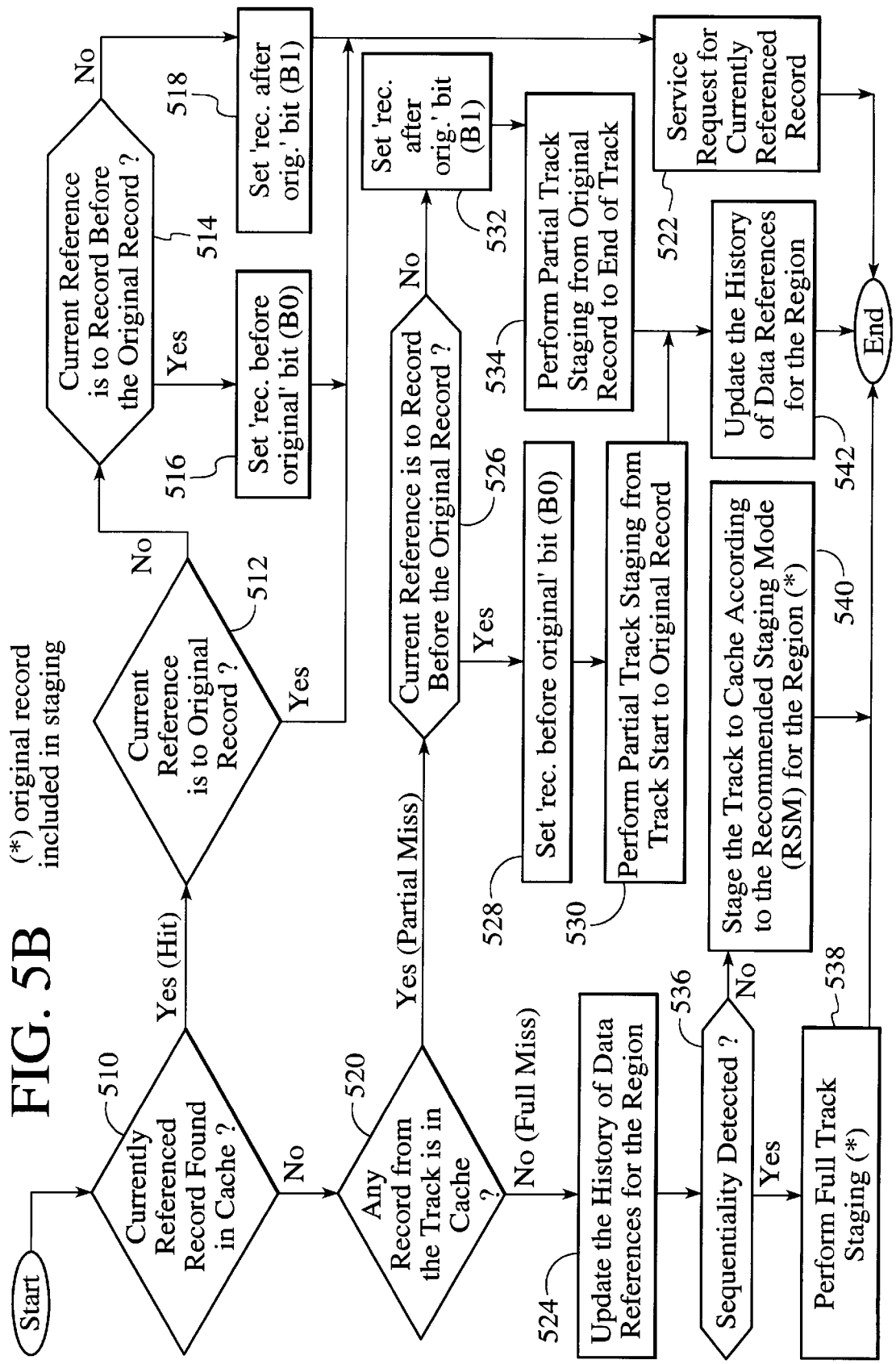
FIG. 5B  (*) original record included in staging

METHOD AND A SYSTEM FOR DETERMINING AN APPROPRIATE AMOUNT OF DATA TO CACHE

FIELD OF THE INVENTION

The present invention relates generally to management of data transfers in a computer system and, more particularly, to a method and system for optimizing the management of such data transfers.

BACKGROUND OF THE INVENTION

The use of mass storage devices in computer systems and, particularly, methods and systems for utilizing cache memory subsystems of mass storage devices are well known. It is also well known to use a memory subsystem as a cache memory to improve the performance of a mass storage system.

A cache storage system can form part of a mainframe computer system, a computer workstation, or any other data processing system in which one or more of processes utilize system resources including cache memory. In a computer system, a cache memory is typically placed between a processor and a larger but slower memory device, for example, a direct access storage device (DASD). Cache memory is used to store data read from the slower memory device which contains the referenced data segment. Storing frequently referenced data segments in cache memory decreases average reference time because of the speed advantage of cache memory over main storage. When the cache memory is filled, older, less recently accessed data is discarded to make room for newer, more recently referenced data. In caching operations, the fundamental caching problem involves establishing an efficient scheme for maximizing the rate of successful data references. Ideally, data is consistently found in cache memory whenever it is referenced.

When data referenced by a process is found in cache memory, the reference is deemed successful and is called a "hit". Conversely, when referenced data is not found in cache memory, the reference is called a "miss". The referenced data not found in cache memory is typically transferred to the cache memory in order to increase the probability of future hit references. When the referenced data is located in cache memory, it replaces data already in cache memory. The deallocated data, typically, the least recently referenced data, is discarded from the bottom of the cache memory.

In order to improve caching efficiency, cache memory management techniques use hit/miss ratio to dynamically control cache memory space and time allocation. Some conventional techniques for allocating cache memory, dynamically evaluate hit rate performance utilizing a process or an algorithm to determine what portion of the cache memory needs to be assigned to each cache memory user. In contrast, other conventional techniques use an arrangement for varying the size of allocated buffers as a function of hit/miss ratio. But, because substantial memory overhead is needed, concerns related to proper utilization of the cache memory arise when such techniques are employed. On one hand, cache memory is regarded as a finite resource. On the other hand, caching operations efficiency is linked to sufficient cache memory allocation.

For example, in systems that utilize write-back caching, write operations will be deferred until destaging is performed thereby adversely affecting caching operations efficiency, unless adequate memory space is available for the write operations. Accordingly, techniques that allocate too much or too little cache memory are deficient. Thus, some conventional methods and systems regulate caching operations in an attempt to more usefully allocate cache memory and speed up data transfer rates. When the resultant caching operations are made more efficient, access delay components are eliminated from the host CPU response time.

However, a problem frequently encountered is how much data to store in cache memory to increase computer system operations efficiency. In a cache disk controller, the amount of data to cache when referenced data not found in cache memory produces a cache miss is a significant determiner of performance. A method and a system for determining the optimal portion of data to be stored result in optimal caching operation and, in turn, in efficient computer operations.

Choosing the wrong mode of caching, that is, the wrong amount of data to cache, results in performance penalties. Staging too much data uses excessive disk and back end data path resources making them unavailable for additional data flow and, in turn, causing increased internal queuing. Staging too much data also means that more cache memory is used than is necessary which lowers the hit rate because other, likely to be referenced data must be removed from the cache memory to make room for the excess data being staged in the cache memory.

Conversely, staging too little data results in higher miss rate because records that should have been in cache memory are not there. A higher miss rate leads to a higher response time thus lower computer system operations efficiency which is manifested by excessive system resources use through increased rate of disk seeks and busy data paths. To mitigate this problem, modern controllers employ methods which facilitate a more flexible approach to data storage.

For example, Hitachi Data Systems (HDS) cache control subsystems model numbers HDS 7700 and HDS 7750 utilize three algorithms to manage cache memory usage: a Sequential Prefetch algorithm, a Least Recently Used (LRU) algorithm, and an Intelligent Learning algorithm. The Sequential Prefetch algorithm, enables prefetching of at least one full set of tracks to satisfy subsequent access from cache at host data transfer speeds. The LRU algorithm, controls the allocation of cache memory segments by placing LRU segments in an LRU list. The Intelligent Learning algorithm, maximizes cache memory usage by identifying random and sequential data access patterns and selecting the amount of data to be staged in cache— that is, a record, a partial track, or a full track. However, it does not appear that this combination of algorithms selects the optimal amount of data to stage.

Other modern controllers, used for example in IBM 3990, also facilitate a more flexible approach to data storage for mitigating the problem of choosing the wrong amount of data to stage. Such controllers employ algorithms that allow caching, or more precisely staging, in one of two modes: record staging, and staging to the end of track. Whereas, record staging is storage in cache memory of a requested record alone, staging to the end of track is storage in cache memory of all records starting from the originally requested record to the end of the track. However, such controllers include arbitrary or empirical decision factors (commonly called "fudge factors") in determining which of the staging modes will produce better performance which, in fact, is not necessarily the optimal performance.

Accordingly, what is needed is a method and a system for optimizing the management of data caching. A method and system for optimizing the management of data caching need to, reliably and consistently, optimize utilization of computer system resources. Such a method and system need also to improve the hit rate. The present invention provides such a method and a system.

SUMMARY OF THE INVENTION

The present invention provides a method and a system for determining how much data to cache, that is, optimizing disk caching control by selecting the optimal staging mode. Specifically, the method and system of the present invention provides an analytical framework for determining how much data to cache thus producing a maximum hit rate and optimal utilization of computer system resources.

The method and system in accordance with the present invention includes determining a history of referencing data on a disk and predicting an optimal staging mode from a plurality of staging modes based upon the history.

The method and system of the present invention in the preferred embodiment allow staging in one of at least three modes: record staging, staging to the end of track, and full track staging. In using the history of data referencing to predict the optimal staging mode, the method and system of present invention provide a thorough analytical framework for determining which of the modes of staging data is most desirable in view of prior referencing patterns.

BRIEF DESCRIPTION OF THE DRAWINGS

FIG. 3 illustrates a plurality of first data structures used in the enhanced cache memory directory to describe the type of references to data for each sub-region staged.

FIG. 4 illustrates plurality of second data structures for accumulating referencing patterns for each region.

FIG. 5B is a flow chart illustrating in greater particularity the determining of history of data references for the region.

DETAILED DESCRIPTION OF THE INVENTION

The present invention relates generally to methods and systems for management of data transfers to and from memory in computer systems and, more particularly, to methods and systems for optimizing the management of such data transfers. The following description of the present invention is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

In a cache disk controller, the amount of data to stage in cache when referenced data not found in cache memory produces a cache miss is a significant determiner of performance. A method and a system for determining the optimal portion of data to be stored will lead to an optimal caching operation and, in turn, to more efficient computer operations.

As has been before-mentioned, choosing the wrong mode of staging, that is, the wrong amount of data to cache, results in performance penalties. Staging too much data uses excessive disk and back end data path resources. Staging too much data also results in cache memory usage more than is necessary which lowers the hit rate. Conversely, staging too little data results in higher miss rate because records that should have been in cache memory are not present there. A higher miss rate leads to a higher response time thus lower computer system operations efficiency which is manifested by excessive system resources use through increased rate of disk seeks and busy data paths. To mitigate this problem, modern controllers employ methods which facilitate a more flexible approach to data storage. However, such controllers do not appear to select the optimal amount of data to stage.

Some controllers employ algorithms that include arbitrary or empirical decision factors in selecting the optimal among two staging modes, record staging and staging to the end of track, which, in fact, is not necessarily the optimal staging mode.

Accordingly, the present invention provides a method and system for handling a plurality of alternative staging modes while providing an analytical framework for determining based on data referencing history the optimal amount of data to stage in cache memory. This analytical framework produces a maximum hit rate and an optimal utilization of computer system resources.

In a preferred embodiment, the method and system of the present invention is implemented for optimizing management of data transfers to and from mass storage devices. The method and system of the present invention can be applied to a cache storage system that may form part of a mainframe computer or any other data processing system.

Figure 1:
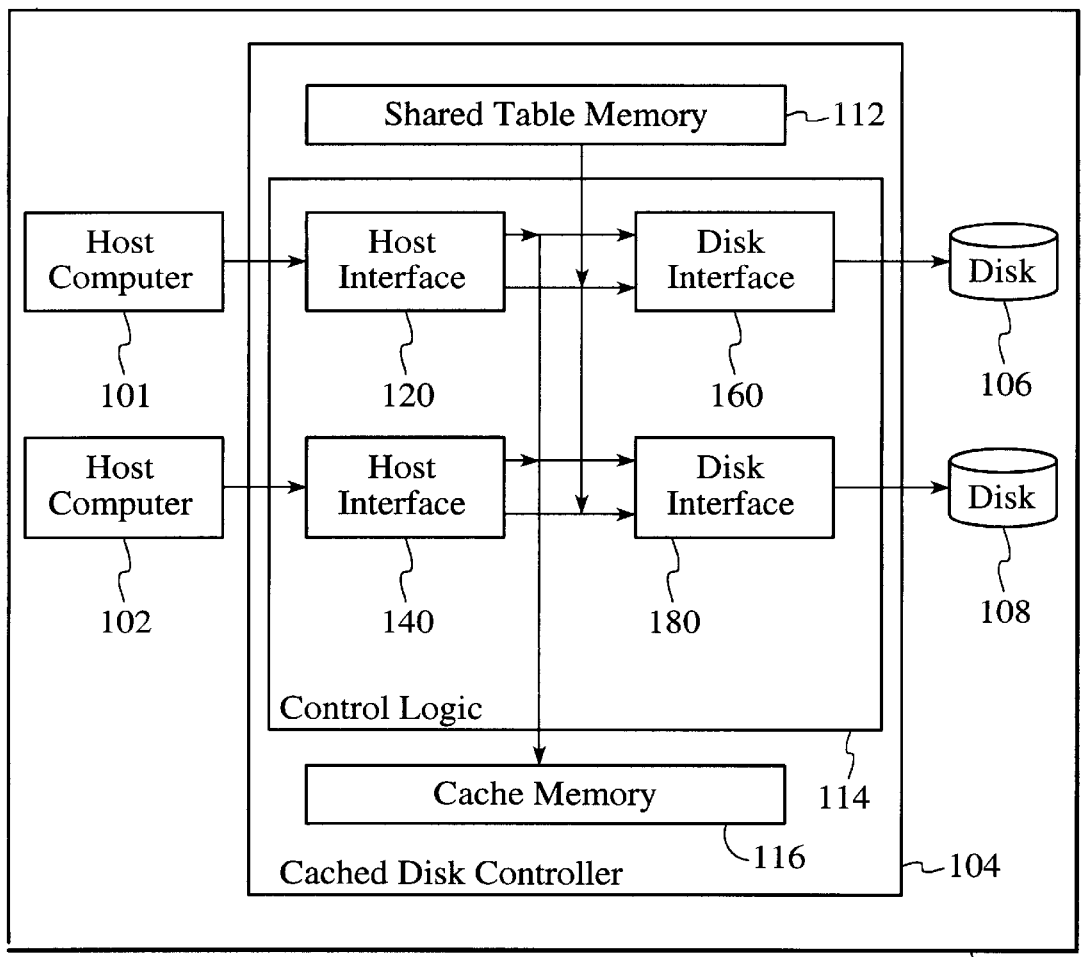
FIG. 1 is a basic block diagram of a system in which the method and system of the present invention may be implemented.

In the preferred embodiment, the present method and system can be used in an IBM 3990 system. FIG. 1 exemplifies such a system 100 in the form of a basic block diagram. Such a system includes one or more host computers 101 and 102, a cached disk controller 104 and one or more larger but slower memory devices 106 and 108, for example, DASD type devices. The cached disk controller 104 includes a shared table memory 112, control logic 114 and a cache memory 116. The control logic 114 includes the host and disk interfaces 120 and 140, and 160 and 180, respectively.

Originally, each logical disk within the memory devices 106 and 108 is divided into fixed or variable size regions thereby creating units of disk space for keeping track of the amount of data to stage. The regions may be logical volumes including one or more cylinders. Each of the regions is divided into fixed or variable size sub-regions such as one or more tracks. In addition, each sub-region includes data segments such as records. However, it can be appreciated that the present invention is also applicable to other architectures which use regions divided into sub-regions other than tracks. It can be further appreciated that the sub-regions may include data segments other than records.

Thus, although the present invention is described in terms of tracks as would be used for a count key data (CKD) controller and in terms of records, it is also applicable to other architectures, for example, open systems, where the portion of data segment staged is potentially larger than the amount requested. Therefore, implementation of such architectures where the sub-regions are not limited to tracks, and the data segments are not limited to records would also be within the spirit and scope of the present invention.

Figure 2:
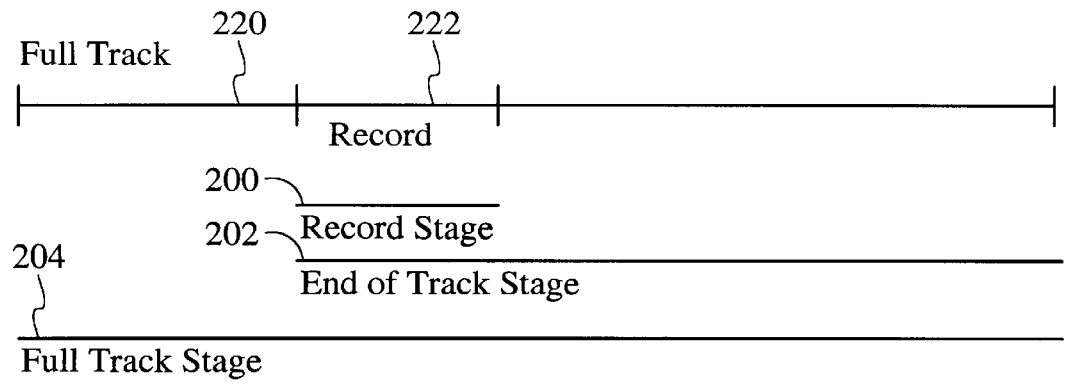
FIG. 2 illustrates three of the data staging modes.

The method and system of the present invention provide a determination of the optimal amount of data to stage in cache memory while handling at least two staging modes. Accordingly, an optimal staging mode is maintained for each region. FIG. 2 illustrates three of the staging modes: record staging 200, end of track staging 202, and full track staging 204. In record staging 200, only the record 222 whose data is being referenced is staged to cache memory. Conversely, in full track staging 204, the entire track 220 is staged to cache memory, while in end of track staging 202, the records from the record 222 whose data was originally referenced to the last record at the end of track 220 are staged to cache memory. It is an advantage of the present invention that the optimal among the staging modes is selected to produce optimal caching operations management. Although the method and system of the present invention may be described with three alternate staging modes—for example, record staging, end of track staging and full track staging—it can be used with any number of staging modes greater than one, and such additional staging modes would be within the spirit and scope of the present invention.

The method and system of the present invention include an enhancement to the cache memory directory in the form of a plurality of first data structures (hereafter referred to as the "first data structures") for keeping the type of data references for each sub-region as shown in FIG. 3. The present invention also includes a plurality of second data structures (hereafter referred to as the "second data structures") for keeping track of referencing patterns based upon the types of data references kept in the first data structures and for indicating the optimal staging mode for each of the regions as shown in FIG. 4.

As illustrated in FIG. 3, the enhancement to the cache memory directory comprises the first data structures 300 for keeping information on data references for each sub-region. Data references can be to a single record, to a record located before a previously referenced record, or to a record following that record. In the first data structures 300 there is one data structure $310_{1-n}$, for each sub-region (1, 2, . . . n) being staged to cache memory. Each data structure $310_{1-n}$, includes a record number $302_{1-n}$ of the originally referenced record in that sub-region, and a plurality of indicators $304_{1-n}$, $306_{1-n}$, . . . $308_{1-n}$ indicating the type of data reference.

In the preferred embodiment, the sub-regions comprise tracks including records. Also, in this embodiment the plurality of indicators $304_{1-n}$, $306_{1-n}$, . . . $308_{1-n}$ comprise a plurality of bits. However, one skilled in the art would recognize that the plurality of indicators are not limited to bits.

Of the plurality of bits $304_{1-n}$, $306_{1-n}$, . . . $308_{1-n}$, a first bit $304_{1-n}$, is set when a reference is to a record positioned within the track before the record (hereafter referred to as the "original record") whose data was originally referenced and which originally caused the stage, and a second bit $306_{1-n}$, is set when a reference is to a record positioned within the track after the original record. The enhancement to the cache directory is advantageous in that it allows determination of the type of staging mode that should be used in any particular stage. A further advantage of this enhancement is that it enables identification of any type of accessing pattern, including nonsequentially ascending or descending access patterns.

As illustrated in FIG. 4, the second data structures 400 are included for keeping track of data referencing patterns for each of the disk regions ($region_{1-n}$) based upon the data referencing types. Each one of the second data structures 400, corresponds to one of the disk regions ($region_{1-n}$). Each of the second data structures 400 in a preferred embodiment comprises a plurality of controller memory segments such as, for example, a plurality of bytes.

In the preferred embodiment, at least four bytes $440_{1-n}$, $442_{1-n}$, $444_{1-n}$, and $446_{1-n}$ correspond to each region ($region_{1-n}$). One byte $440_{1-n}$ of the at least four bytes holds the recommended staging mode $RSM_{1-n}$ for the region. The remaining three bytes $442_{1-n}$, $444_{1-n}$, and $446_{1-n}$ hold counters $E_{1-n}$, $F_{1-n}$, and $R_{1-n}$. (Hereafter, unless correlated to a specific region, i.e. $region_x$, $E_{1-n}$, $F_{1-n}$, and $R_{1-n}$ are collectively referred to as "E," "F," and "R," respectively). There is one counter for each of the staging modes. For example, E stands for end of track staging, F stands for full track staging, and R stands for record staging. The counters E, F, R etc., keep an accounting of what the controller of data staging to cache should have done on any particular staging operation with respect to each region ($region_{1-n}$).

To more particularly describe the features of the present invention, refer now to FIGS. 5A–G in accordance with the following description.

Figure 5A:
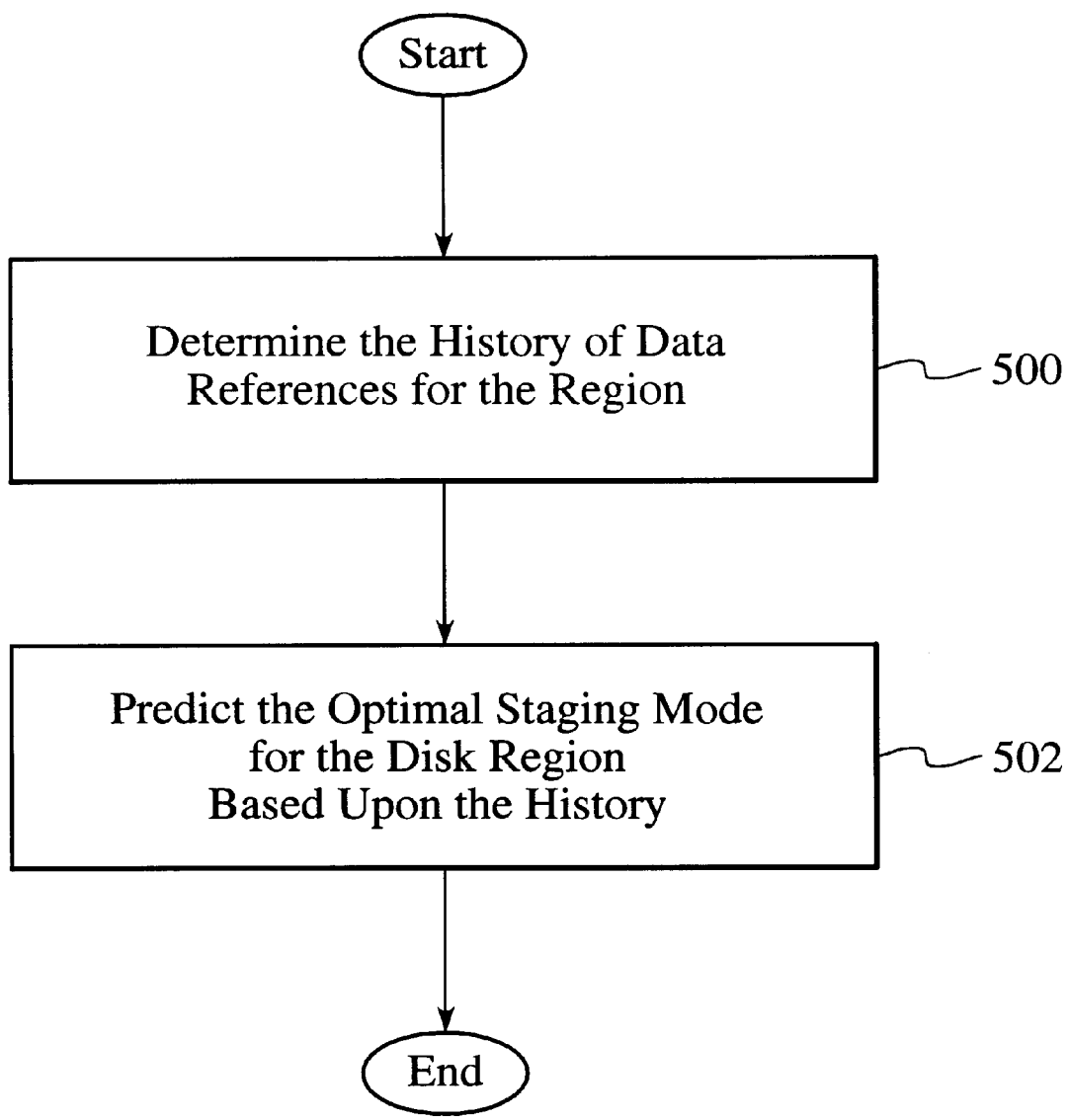
FIG. 5A is a top level flow chart illustrating the method and system of the present invention for determining an appropriate amount of data to stage in cache memory.

FIG. 5A is a top level flow chart illustrating the method and system of the present invention for determining an appropriate amount of data to stage in cache memory. Referring now to the top level flow chart of FIG. 5A, when a host CPU initiates a memory access, it may prompt a track staging. Accordingly, first, a history of data references for the region is determined, via step 500. Thereafter an optimal staging mode for the region from a plurality of staging modes is predicted based upon the history so as to maximize the number of successful data references, or hits, via step 520. Hence, the method and system in accordance with the present invention provide reliable and consistent predictions of the optimal staging and, thereby, the hit rate of references to data in each region is improved as well.

The method and system in accordance with the present invention, as illustrated in FIG. 5A, is illustrated in greater detail in the flow charts of FIGS. 5B–G and in the accompanying description below.

An important feature of the present invention is determining the history of data references for the region. Thus, the flow chart of FIG. 5B illustrates in greater particularity determining the history of data references for the region (step 500) of the flow chart in FIG. 5A.

Referring now to the flow chart in FIG. 5B. First, it is determined if the currently referenced record is found in cache memory, via step 510.

If the currently referenced record is found in cache memory, it is a hit. Accordingly, it is then determined if the current reference is to the original record, via step 512. If the current reference is to the original record, the request for referencing the record is serviced, via step 522. However, if the current reference is not to the original record, it is determined if the current reference is to a record positioned within the track before the original record, via step 514.

If the current reference is to a record positioned within the track before the original record, then a 'record before original' bit is set in one of the first data structures 300 (FIG. 3) which corresponds to the track, via step 516. Thereafter, the request for referencing the record is serviced, via step 522. If, however, the current reference is not to a record positioned within the track before the original record, it is a reference to a record positioned within the track after the original record and therefore a 'record after original' bit is set in one of the first data structures 300 which corresponds to the track, via step 518. The request for referencing the record is then serviced, via step 522. For the currently referenced records which are found within cache memory, the history determining ends here.

If the currently referenced record is not found in cache memory, it is either a partial miss if part of the track is present in cache memory but the currently referenced record is not found there, or it is a full miss if the entire track is missing from cache. Accordingly, it is then determined if any record from the track can be found in cache memory, via step 520.

If there is any record from the track in cache memory, it is then determined if the current reference is to a record positioned within the track before the original record, via step 526. If the current reference is to a record positioned within the track before the original record, then the 'record before original' bit is set in one of the first data structures 300 which corresponds to the track, via step 528.

Further, the track is partially staged from the beginning of the track up to the original record, via step 530. Thus, for example, if the original record is the ninth record, then the track is partially staged from the first record to the eight. If, however, the current reference is not to a record positioned within the track before the original record, it is a reference to a record positioned within the track after the original record. Therefore the 'record after original' bit is set in one of the first data structures 300 which corresponds to the track, via step 520. The track is then partially staged from the end of the original record to the end of the track, via step 534. Thereafter, for the partial miss, the history of data references is updated, via step 542, then the procedure ends.

Otherwise, if no record from the track can be found in cache memory it is a full miss. Therefore, the history of data references for the track being deallocated is updated, via step 524. Then, it is determined if sequentiality of data referencing is detected, via step 536. If sequentiality of data referencing is detected, then full track staging is performed, via step 538. If, however, sequentiality of data referencing is not detected, the track is staged according to the recommended staging mode (RSM) for the region, via step 540, then the procedure ends.

Hence, referencing patterns are determined and updated for establishing a history for the region. Through this process, the history is accumulated with the assumption that the future will approximate the past. Thereafter, a cache memory control unit can determine for every track staged what would have been the best mode of staging for the region, one that would have produced a hit rather than a miss.

An important feature of the present invention is updating the history of data references for the region. Therefore, the flow chart of FIG. 5C describes in greater detail updating the history of data references for the region (step 542) of the flow chart in FIG. 5B.

Figure 5C:
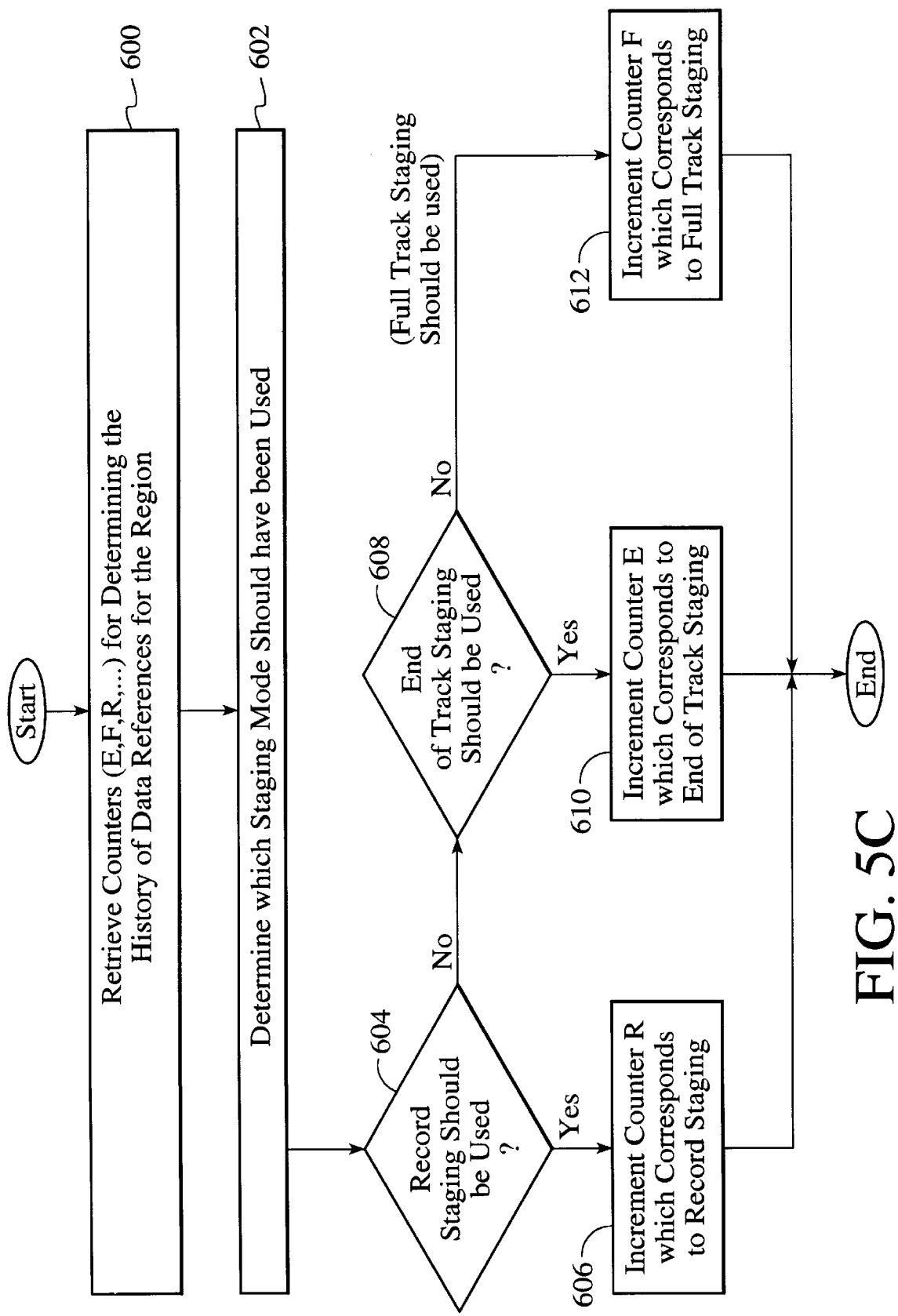
FIG. 5C is a flow chart describing in greater particularity the updating of history of data references for the region.

Referring now to FIG. 5C, the counter E, F, or R being incremented is the one corresponding to the staging mode which should have been used in staging data from the track to cache memory. So, first, the values of counters E, F, and R are retrieved, via step 600. Then, the staging mode that should have been used is determined, via step 602. Following the determination of which one of the staging modes should have been used, via step 602, it is determined which of the staging modes is indicated as the one that should have been used, via steps 604, 608, and 612, respectively. Hence, if record staging is indicated, the counter R is incremented, via step 606. If end of track staging is indicated, the counter E is incremented, via step, 610. If neither record staging not end of track staging are indicated, the counter F is incremented, via step or 612.

Appropriately, whenever any of the counters E, F or R being incremented reaches near overflow, to prevent it, all of the counters E, F, and R are down-scaled similarly to preserve their relationship to each other, for example, by dividing their respective values by two (i.e., shift right one bit). Down-scaling (not shown here) also has the benefit of increasing the weight of more recent accesses relative to previous accesses.

An important feature of the present invention is determining which staging mode should have been used for staging. Thus, in the flow chart of FIG. 5D, determining which of the staging modes should have been used for staging data from the track to cache memory (step 602) of the flow chart in FIG. 5C is illustrated in greater detail.

Figure 5D:
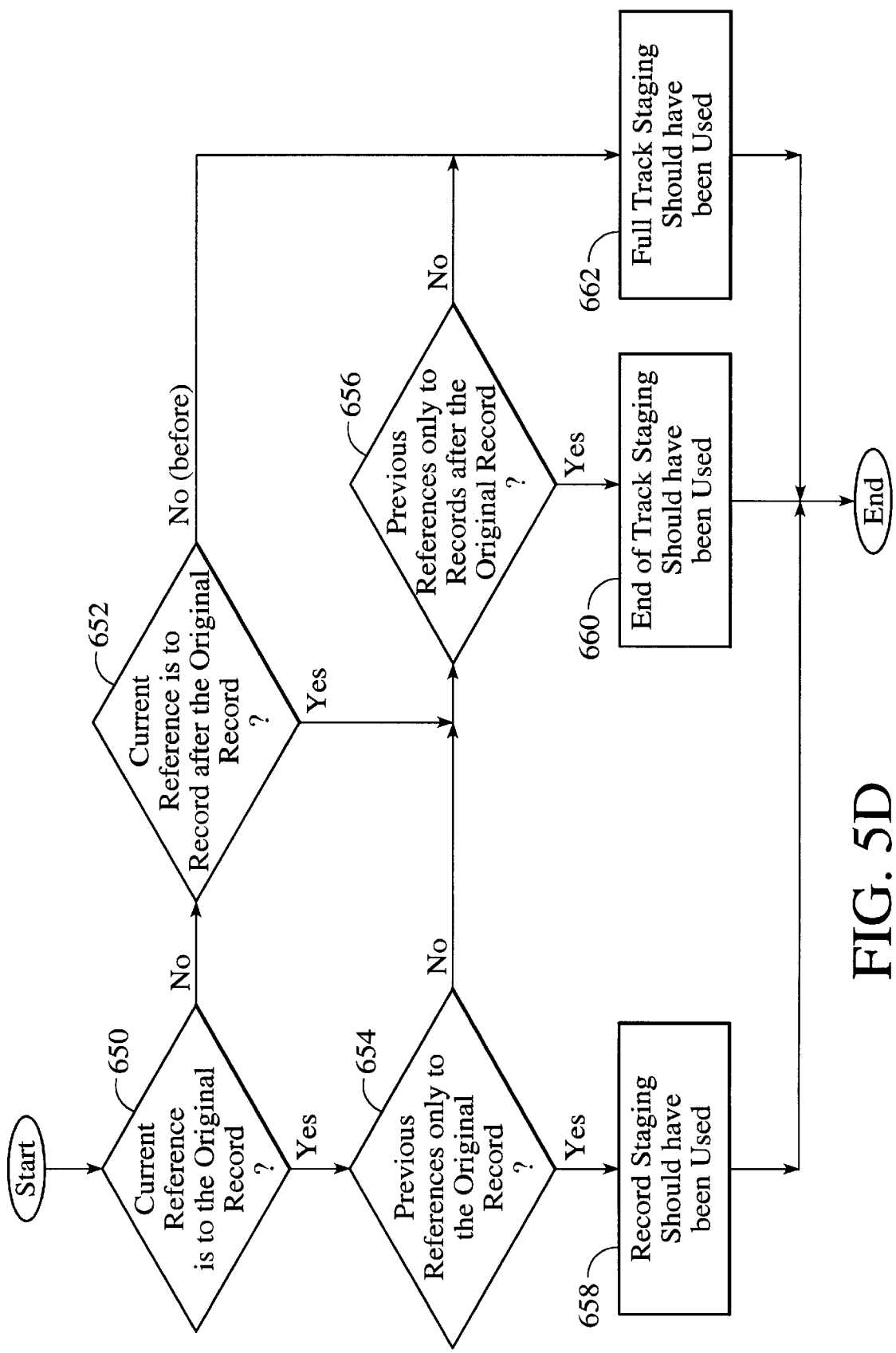
FIG. 5D is a flow chart illustrating in greater particularity the determining of which staging mode should have been used for staging data from the region to cache.

Refer now to the flow chart in FIG. 5D. First, it is determined if the current reference is to the original record, via step 650. If the current reference is to the original record, then it is determined if previous references were made only to the original record, via step 654. If all previous references were made to the original record, then it is indicated that record staging should have been used, via step 658. However, if previous references were made not only to the original record, then it is determined if previous references were made to records positioned only after the original record, via step 656. If previous references were made to records positioned only after the original record, then it is indicated that end of track staging should have been used, via step 660.

If the current reference is not to the original record, then it is determined if the current reference is to a record positioned after the original record, via step 652. If the current reference is to a record positioned after the original record, then it is determined if previous references were made only to records that are positioned after the original record, via step 656. If previous references were made only to records that are positioned after the original record, then it is indicated that end of track staging should have been used, via step 660.

If the current reference is neither to the original record nor to a record positioned after the original record, then the current reference is to a record positioned within a track before the original record. In this case, it is indicated that full track staging should have been used, via step 662.

Also, if the current reference is either to the original record or to a record positioned within the track after the original record and previous references were made to records positioned before the original record, then likewise it is indicated that full track staging should have been used, via step 662.

The previously mentioned prediction of optimal staging mode for the region based upon the history of data references for that region is an important feature of the present invention. Accordingly, the flow chart of FIG. 5E illustrates with greater particularity prediction of optimal staging mode for the region based upon the history of data references (step 502) of the flow chart in FIG. 5A. Referring to FIG. 5E, it is first determined if a cache hit, a full miss or a partial miss, has occurred, via step 702. If a cache hit has occurred, no more action need be taken with respect to RSM adjustment for the region.

If a partial miss has occurred, then the recommended staging mode (RSM) for the region is adjusted to the optimal staging mode, via step 706.

If, a full miss has occurred, which also means that a track is being deallocated, then it is determined if the counter E, F, or R being incremented corresponds to the staging mode that was actually being used, via step 704. If the counter E, F, or R being incremented does not correspond to the staging mode that was actually being used, the RSM for the region is adjusted to the optimal staging mode, via step 706.

Adjustment of the RSM to the optimal staging mode is an important feature of the present invention. Accordingly, adjustment of the RSM is further detailed in FIG. 5F as described below.

Figure 5F:
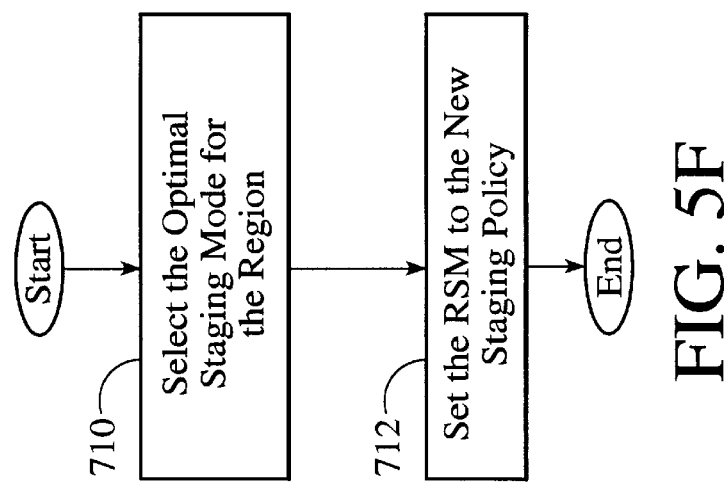
FIG. 5F is a flow chart illustrating in greater particularity the adjusting of the recommended staging mode (RSM) to the optimal staging mode for the region.
Figure 5E:
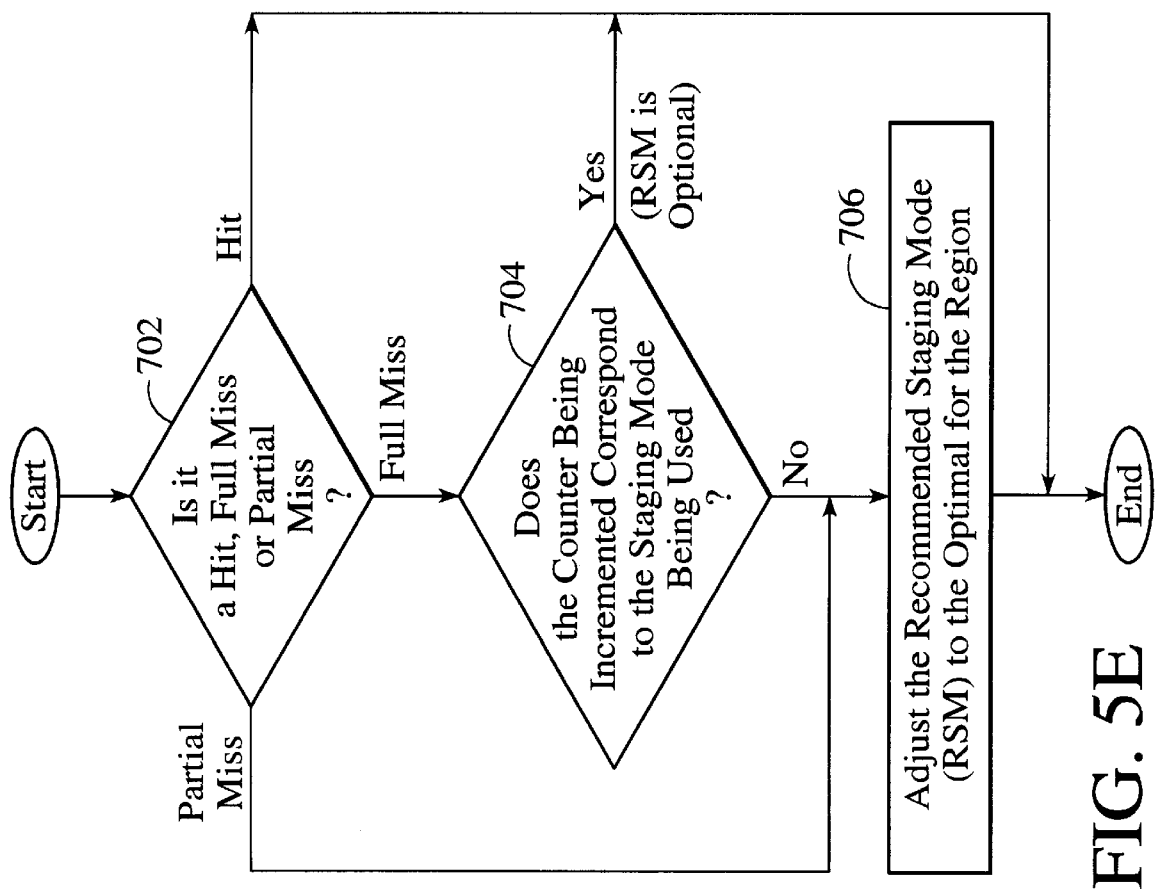
FIG. 5E is a flow chart illustrating in greater particularity the predicting of the optimal staging mode for the region based upon the history of data references for the region.

Referring to FIG. 5F, it is a flow chart illustrating in greater particularity adjusting the RSM to the optimal staging mode for the region (step 706) of the flow chart in FIG. 5E. First, the optimal staging mode is selected, via step 710. Then RSM is set to the new staging policy, via step 712.

The method and system according with present invention incorporate an analytical approach to selecting the optimal among the modes of data staging. This approach allows a cache memory controller to make a best selection, choosing the optimal among the staging modes, with the aid of one, non-arbitrary parameter (K).

In selecting the optimal staging mode, a plurality of cost values, each associated with one of the plurality of staging modes are calculated using a constant, K, and a plurality of counters E, F, and R. K is a ratio between the cost of not staging enough and staging too much and is dependent on each disk system being used. For example, K is low for fast disks, and it is high for large disks. K is irrelevant for full track staging because insufficient staging is impossible when the entire track is staged. Counter E corresponds to end of track staging, counter F corresponds to full track staging, and counter R corresponds to record staging.

Figure 5G:
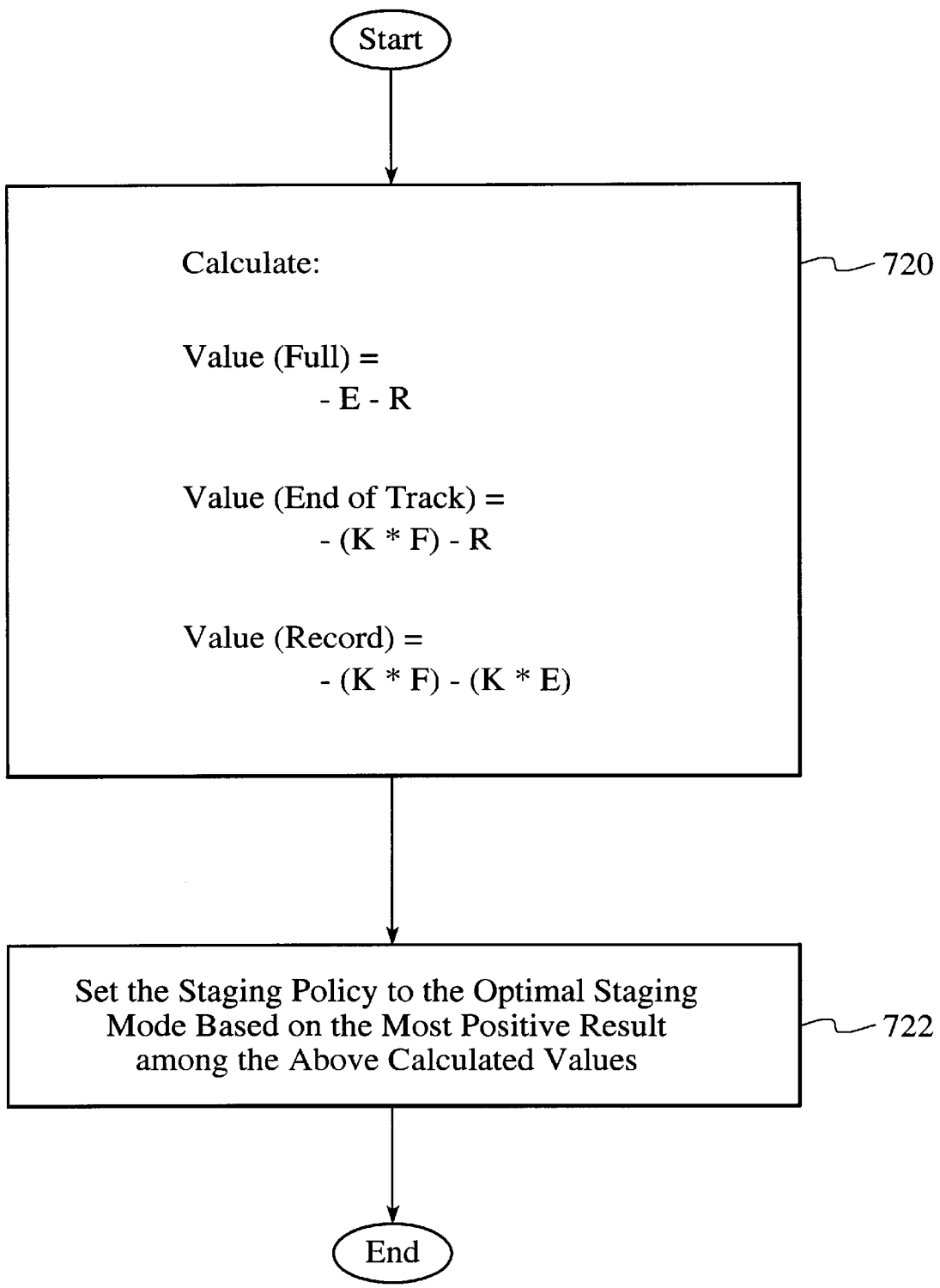
FIG. 5G is a flow chart illustrating the selection of optimal staging mode for the region.

FIG. 5G is a flow chart illustrating the selection of an optimal staging mode for the region in the preferred embodiment. The sum of the plurality of counters, for example, E+F+R, equals the total number of stages for the region. Accordingly, the cost value ($V_{full}$) associated with full track staging is calculated, the cost value ($V_{end\ of\ track}$) associated with end of track staging is calculated, and the cost value ($V_{record}$) associated with record staging is calculated, via step 720. Each cost value is preferably a signed-integer variable which can be negative or positive.

In the preferred embodiment, as shown in step 20 of FIG. 5G, the constant K and the plurality of counters, E, F, and R, are applied in the following manner to calculate the cost values.

$$V_{full} = -E - R;$$

$$V_{end\ of\ track} = -(K*F) - R;$$

$$V_{record} = -(K*F) - (K*E)$$

Among the resulting cost values, the most positive cost value corresponds to the best staging mode. The most positive cost value information indicates what staging mode would have been the best for any given region in the recent past. Since history tends to repeat itself, the best mode in the recent past should also be the best mode in the near future. So, the new staging policy is set in a preferred embodiment to correspond to the most positive cost value, via step 722. That is, the staging policy is set to a value corresponding to the optimal staging mode.

One of ordinary skill in the art recognizes that other, mathematically equivalent formulas can be used in the selection of an optimal staging mode for the region wherein the staging policy can be set to correspond to other values such as most negative, zero or some other value, and its use would be within the spirit and scope of the present invention.

Accordingly, the method and system of the present invention maximize data transfer operations efficiency by, reliably and consistently, selecting the optimal staging mode for staging data to cache. This is accomplished by incorporating in the method and system of the present invention an analytical framework for the reliable and consistent selection of the optimal staging mode from among a plurality of staging modes. The improved data transfer operations efficiency produced by the present invention is manifested by improved hit/miss ratio, improved response time to data requests and references, and improved utilization of computer storage and data paths resources. In addition, the present invention provides the advantages of adaptability to fixed or variable size disk regions, of working with sequential detect algorithm, and of identifying and responding to a variety of accessing patterns.

Although the present invention has been described in accordance with the embodiment shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for determining an appropriate amount of data to stage in cache memory in a data processing comprising the steps of:
   a) determining a history of data accessing and storage on a disk, the disk including a plurality of regions, each of the plurality of regions having at least one sub-region, wherein each of the plurality of regions is associated with a plurality of counters, each of the plurality of counters corresponding to one the plurality of staging modes, the step of determining a history further comprising the steps of:
      a1) determining which one of the plurality of staging modes should have been used based upon a data reference type; and
      a2) incrementing a counter, the counter being one of the plurality of counters associated with the region and corresponding to the one of the plurality of staging methods that should have been used;
   b) maintaining within a cache directory a data structure for each of the plurality of sub regions, said data structure comprising:
      b1) a data segment identifier of an originally referenced data segment; and
      b2) a plurality of indicators; wherein, a first indicators of the plurality of indicators is set when a current reference is to a data segment positioned in the sub-region after the originally referenced data segment, and a second indicator is set when a current reference is to a data segment positioned in the sub-region before the originally referenced data segment, for establishing the data reference type; and c) predicting an optimal staging mode from a plurality of staging modes based upon the history.

2. The method of claim 1 wherein the staging mode determining step (a1) further comprises the steps of:

a1a) determining if the current reference is to an originally referenced record;

a1b) determining whether previous references were made only to the originally referenced record if the current reference is to the originally reference record; and a1c) indicating that record staging should have been used if the previous references were made only to the originally referenced record.

3. The method of claim 1 wherein the staging mode determining step (a1) further comprises the steps of:

a1a) determining if the current reference is to a record positioned after an originally referenced record;

a1b) determining whether previous references were made to other records positioned within the sub-region after the originally referenced record if the current reference is to the record positioned after the originally referenced record; and a1c) indicating that end of sub-region staging should have been used if the previous references were made to the other records positioned within the sub-region after the originally referenced record.

4. The method of claim 1 wherein the staging mode determining step (a1) further comprises the steps of:

a1a) determining if the current reference is to a record positioned within the sub-region before an originally referenced record; and a1b) indicating that full sub-region staging should have been used if the current reference is to the record positioned within the sub-region before the originally referenced record.

5. The method of claim 1 wherein the staging mode determining step (a1) further comprises the steps of:

a1a) determining if the current reference is to an originally referenced record;

a1b) determining whether previous references were made to other records positioned within the sub-region before the originally referenced record if the current reference is to the originally referenced record; and a1c) indicating that full sub-region staging should have been used if the previous references were made to the other records positioned within the sub-region before the originally referenced record.

6. The method of claim 1 wherein the staging mode determining step (a1) further comprises the steps of:

a1a) determining if the current reference is to a record positioned in the sub-region after an originally referenced record;

a1b) determining whether previous references were made to other records positioned within the sub-region before the originally referenced record if the current reference is to the record positioned in the sub-region after an originally referenced record; and a1c) indicating that full sub-region staging should have been used if the previous references were made to the other records positioned within the sub-region before the originally referenced record.

7. The method of claim 1 wherein the incrementing step (a2) further comprises the step of down-scaling each of the plurality of counters if the counter is nearing an overflow after being incremented.

8. The method of claim 1, wherein the determining step (a) further comprises the steps of:

a3) detecting a sequentiality of data references;

a4) prompting a staging of the sub-region according to the staging policy for the region if the sequentiality has not been detected; and a5) allowing the staging of the sub-region in its entirety if the sequentiality has been detected.

9. The method of claim 1 wherein the data segment further comprises a record.

10. The method of claim 9 wherein the predicting step c further comprises the steps of:

c1) determining if the sub-region is being deallocated;

c2) determining if there is a partial miss if the sub-region is not being deallocated.

11. The method of claim 10, wherein the predicting step further comprises the steps of:

c3) determining if the counter being incremented corresponds to the one of the plurality of staging modes which is being used if the partial miss occurred;

c4) adjusting the recommended staging mode to the optimal staging mode if either, the partial miss occurred and the counter does not correspond to the one of the plurality of staging modes which is being used, or the sub-region is being deallocated.

12. The method of claim 11, wherein the adjusting step c4) further comprises the steps of c4a) calculating a plurality of values based upon the history of data references for the region, wherein each of the plurality of values corresponds to one of the plurality of staging modes;

c4b) selecting an optimal staging mode which corresponds to one of the plurality of values from among the plurality of staging modes; and c4c) setting a staging policy for the region to equal the optimal staging mode.

13. The method of claim 12, wherein each of the plurality of values comprises a number, the number being a signed integer.

14. The method of claim 13, wherein one of the plurality of values having a most positive number among the plurality of values corresponds to the optimal staging mode.

15. The method of claim 14, wherein the calculating step (c4a) further calculates three values, $V_R$, $V_E$, and $V_F$, wherein $$V_R = -(K \times F) - (K \times E);$$

$$V_E = -(K \times F) - R;$$

and $$V_F = -E - R;$$

wherein K is a constant; and wherein R corresponds to a record staging and is one of the plurality of counters, E corresponds to an end of track staging and is another one of the plurality of counters, and F corresponds to a full track staging and is yet another one of the plurality of counters.

* * * * *